(12) United States Patent
Raggam

(10) Patent No.: US 7,925,223 B2
(45) Date of Patent: Apr. 12, 2011

(54) COIL PAIR WITH CARRIER SUPPRESSION

(75) Inventor: Peter Raggam, St. Stefan I. R. (AT)

(73) Assignee: Infineon Technologies AG, Neubiberg (DE)

( * ) Notice: Subject to any disclaimer, the term of this patent is extended or adjusted under 35 U.S.C. 154(b) by 816 days.

(21) Appl. No.: 11/782,465

(22) Filed: Jul. 24, 2007

(65) Prior Publication Data

US 2009/0026266 A1    Jan. 29, 2009

(51) Int. Cl.
*H01Q 7/00* (2006.01)
*H01Q 1/36* (2006.01)
*H04B 1/10* (2006.01)

(52) U.S. Cl. .......... 455/78; 455/202; 455/296; 343/741; 343/866; 343/895

(58) Field of Classification Search .......... 235/451, 235/492, 380; 340/10.1
See application file for complete search history.

(56) References Cited

U.S. PATENT DOCUMENTS

| | | | | |
|---|---|---|---|---|
| 4,922,261 A | * | 5/1990 | O'Farrell | 343/742 |
| 5,072,222 A | | 12/1991 | Fockens et al. | |
| 6,137,447 A | * | 10/2000 | Saitoh et al. | 343/742 |
| 6,584,301 B1 | * | 6/2003 | Bohn et al. | 455/41.1 |
| 6,960,984 B1 | * | 11/2005 | Vicci et al. | 340/10.1 |
| 2006/0192007 A1 | * | 8/2006 | Ide | 235/451 |

OTHER PUBLICATIONS

Final Committee Draft, ISO/IEC 14443-1, Identification Cards—Contactless integrated circuit(s) cards—Proximity cards, Part I: Physical Characteristics, pp. 1-4, Annex A-B, 1997.
Final Committee Draft, ISO/IEC 14443-2, Identification cards—Contactless integrated circuit(s) cards—Proximity cards—Part 2: Radio frequency power and signal interface, pp. 5-15, Annex A, 1999.
Final Committee Draft, ISO/IEC 14443-3, Identification cards—Contactless integrated circuit(s) cards—Proximity cards—Part 3: Initialization and anticollision, pp. 1-38, Annex C, pp. 1-5, 1999.
Final Committee Draft, ISO/IEC 14443-4, Identification cards—Contactless integrated circuit(s) cards—Proximity cards—Part 4: Transmission protocol, pp. 1-33, 2000.
Final Committee Draft, ISO/IEC 10373-6, Identification cards—Test methods—Part 6: Proximity cards, pp. 1-19, Annex D-F, 2000.

* cited by examiner

*Primary Examiner* — Matthew D Anderson
*Assistant Examiner* — Gennadiy Tsvey
(74) *Attorney, Agent, or Firm* — Dickstein Shapiro LLP

(57) ABSTRACT

A coil pair having a transmission coil and a reception coil. The transmission coil is configured to transmit a transmission signal having a carrier. The reception coil is configured to receive from a source a reception signal having the carrier and data, and to significantly suppress the carrier while maintaining coupling with the source at any position along and any position proximate to the reception coil.

14 Claims, 7 Drawing Sheets

COIL PAIR WITH CARRIER SUPPRESSION

BACKGROUND OF THE INVENTION

The present invention is directed generally to carrier suppression in a proximity contactless card system.

The basic components of a proximity contactless card system are the contactless reader and a proximity card. The contactless reader is a single or dual loop reader coil connected to an electronic circuit.

The proximity card has an inductive coil and an integrated circuit connected to ends of this coil.

A proximity contactless system is based on the concept of magnetic coupling, which is the principle that current flowing in one circuit can induce current flow in another circuit through a radio frequency (RF) field generated in the space between the circuits.

In operation, the reader coil transmits to the proximity card a carrier signal, which generates the radio frequency (RF) field to supply the proximity card with power, and data, which is achieved by amplitude modulation of the carrier signal. The proximity card transmits data by modulating the carrier, and this modulated signal is detected by the reader coil.

More specifically, the combination reader-proximity card behaves as a transformer. An alternating current (i.e., carrier signal) passes through the reader coil in the reader to create the RF field, which induces a current in the proximity card coil. The proximity card converts the RF field generated by the reader coil into a DC voltage by means of a diode rectifier. This DC voltage is used to power the proximity card's internal circuits. The proximity card also modifies the received carrier signal in a way corresponding to data on the proximity card, and retransmits the modified carrier signal back to the reader. The modified carrier signal of the proximity card is coupled with the reader coil of the reader. A voltage divider, typically capacitive or resistive, and connected between the reader coil and the receiver input of the reader circuitry, dampens the high voltage of the modified carrier signal to a limited value.

Some proximity contactless systems have separate transmission and reception coils. In such systems, in order for the reader to be able to read the data transmitted on the modified carrier signal by the proximity card coil, the carrier signal field from the reader coil should cancel or suppress the carrier signal field from the proximity card coil. Field cancellation is simply achieved by inducing two voltages with the same amplitude but opposite direction (180° phase shift).

By way of example, carrier suppression is realized in a test apparatus for a contactless proximity card as defined in ISO/IEC (International Organization for Standardization/International Electrotechnical Commission) 10373-6. The test apparatus has a proximity coupling device (PCD) (transmitter coil) coaxially located between two parallel sense coils (reception coils). An RF amplifier has to be used in most cases to produce the required magnetic field strength of the PCD. The sense coils are connected to a balance circuit. An oscilloscope connected to a probe on the balancing circuit measures the modulated response signal strength of the proximity card.

Each of the sense coils is located at the same fixed distance of 37.5 mm from the PCD coil, so that induced voltages in the sense coils are canceled (180° phaseshift). Without the proximity card placed in a position at one of the sense coils, there is no carrier signal readable. During testing, the proximity card is placed at one of the sense coils, and the proximity card generates its own field due to current flow in the proximity card coil.

BRIEF SUMMARY OF THE INVENTION

One aspect of the present invention provides a coil pair having a transmission coil and a reception coil. The transmission coil is configured to transmit a transmission signal having a carrier. The reception coil is configured to receive from a source a reception signal having the carrier and data, and to significantly suppress the carrier while maintaining coupling with the source at any position along and any position proximate to the reception coil.

DETAILED DESCRIPTION OF THE INVENTION

In the following Detailed Description, reference is made to the accompanying drawings, which form a part hereof, and in which is shown by way of illustration specific embodiments in which the invention may be practiced. In this regard, directional terminology, such as "upward," "downward," "into the paper," "out of the paper," "clockwise," "counter-clockwise," etc., is used with reference to the orientation of the figures being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
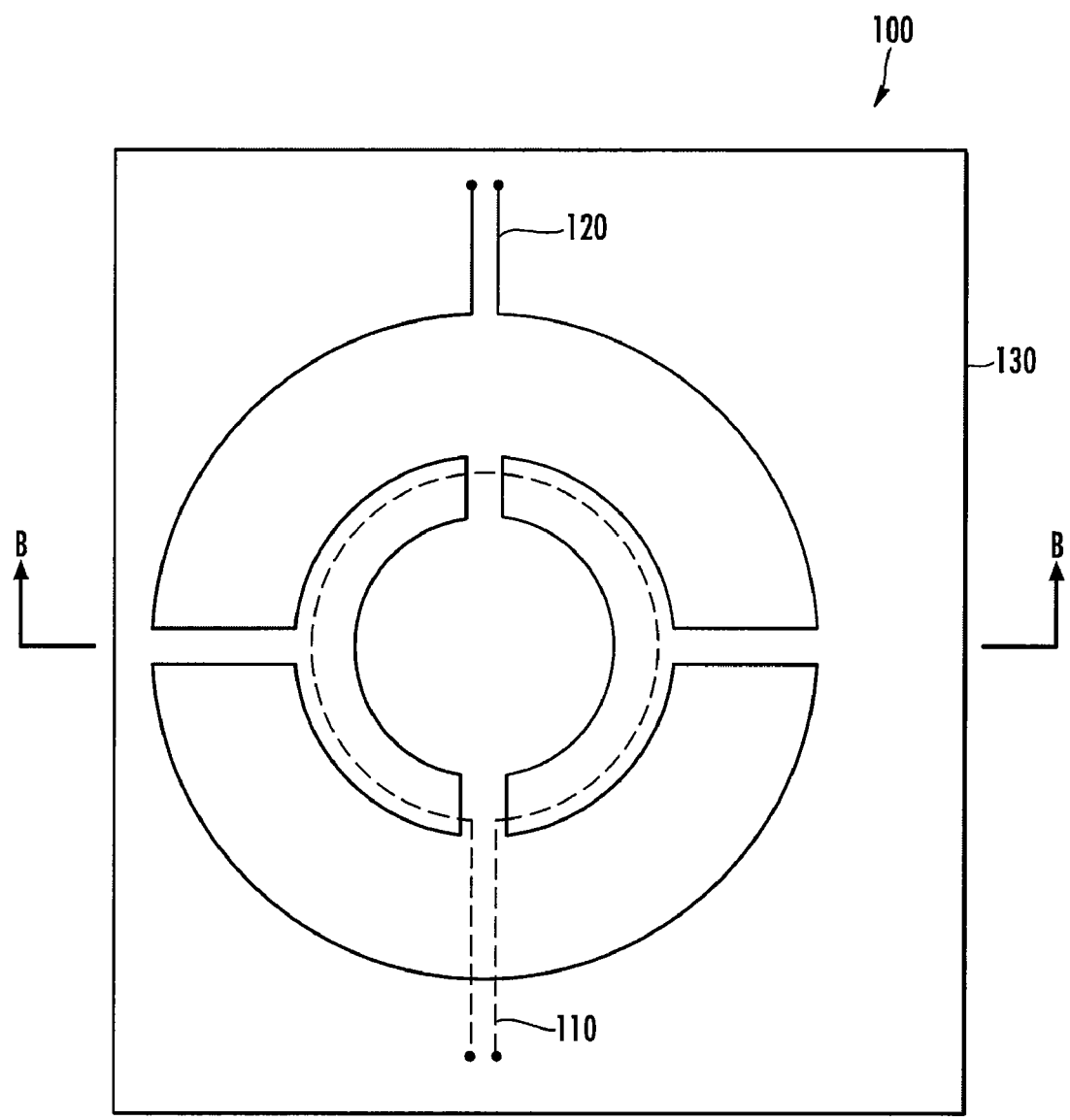
FIG. 1A is a plan view of a reader coil arrangement according to an embodiment of the present invention.
Figure 1B:
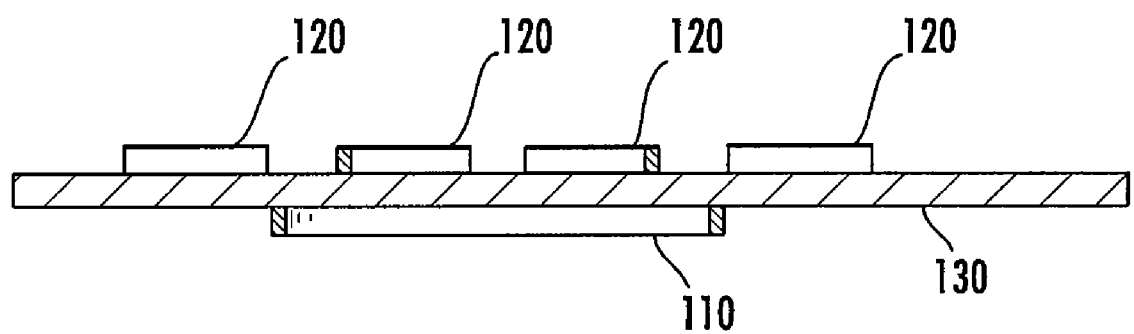
FIG. 1B is a cross-sectional view of the reader coil arrangement of FIG. 1A taken along line B-B.

FIG. 1A is a plan view of a reader coil arrangement according to an embodiment of the present invention, and FIG. 1B is a cross-sectional view of the reader coil arrangement of FIG. 1A taken along line B-B. The reader coil arrangement 100 includes a loop transmission coil 110 and a separate reception coil 120. The transmission coil 110 and the reception coil 120 are each substantially circular and concentrically located, and the transmission coil 110 and reception coil 120 are located on opposing sides of a printed circuit board (PCB) 130. Alternatively, and although not shown, the transmission coil 110 and reception coil 120 may be located on a same side of the PCB 130.

The transmission coil 110 is configured to transmit a transmission signal, which has a carrier signal and data. The reception coil 120 is configured to receive from a proximity card (not shown in FIGS. 1A and 1B) a reception signal having the carrier signal and its own data. The data of each of the transmission signal and the reception signal is achieved by amplitude or phase modulation of the carrier signal.

The shape of the reception coil 120 is designed such that the carrier signal field induced in the reception coil 120 is suppressed by the carrier signal field of the transmission coil 110, while maintaining the ability to have coupling with the proximity card coil at any position along and any position proximate to the reception coil 120. For example, the proximity card may couple with a transmission coil 110 or the reception coil 120 at any position that is approximately within 10 cm proximate to the reception coil. When data is to be read from a proximity card, the proximity card is brought within proximity of the reader coil arrangement, and the reception coil 120 reads the proximity card data by detecting a field produced by current flow in the coil of the proximity card.

Field suppression occurs during induction of two voltages with the same amplitude but opposite direction (180° phase shift). When the proximity card is not located near the reader coil arrangement 100, there is substantially complete field suppression.

It should be noted that there are actually two fields inducing currents in the reception coil 120. The first induced current is due to the field of the transmitting coil 110. The second induced current is due to current changes (generated by load modulation of the carrier) from the proximity card coil. This is the useable field for data reception. The coupling between the proximity card coil and the reception coil 120 should therefore be maximized. Coupling is the extent to which the magnetic field of each coil overlaps the other coil.

The transmission coil 110 and reception coil 120 are preferably implemented so as to be located on opposite sides of a PCB board 30. A PCB board is a suitable carrier because its dielectric constant allows sufficient magnetic field cancellation.

The shape of the reception coil 120 results in the reader coil arrangement 100 being able to maintain coupling with the proximity card coil at any position along and any position proximate to the reception coil 120. Also, the data of the reception signal may be read without the proximity card needing to be located at a predetermined distance relative to the reception coil 120. A more detailed explanation follows.

Figure 1C:
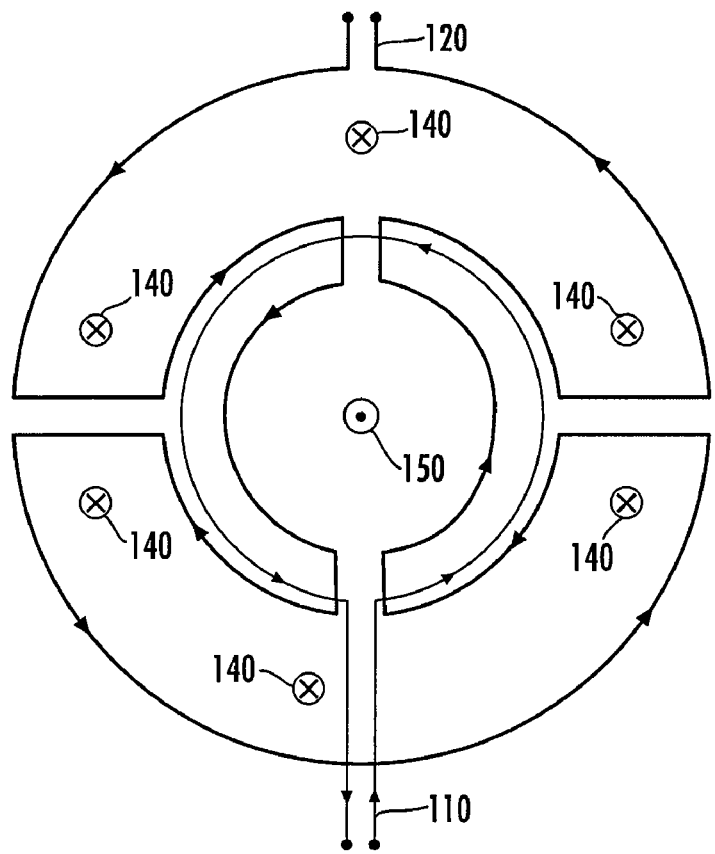
FIG. 1C is a diagram showing current flow of the reader coil arrangement of FIG. 1A.

FIG. 1C is a plan view of a diagram showing the current flow through the transmission coil 110 and the reception coil 120 of the reader coil arrangement 100 of FIG. 1A when a proximity card is not within proximity of the reader coil arrangement 100. The arrows along the transmission coil 110 represent the direction of current flow during transmission of a transmission signal, and the arrows along reception coil 120 represent the direction of induced current flow. The cross-circles 140 represent a transmission field direction into the paper on which FIG. 1C is drawn. The dotted-circle 150 represents a transmission field direction from the paper on which FIG. 1C is drawn.

Figure 1D:
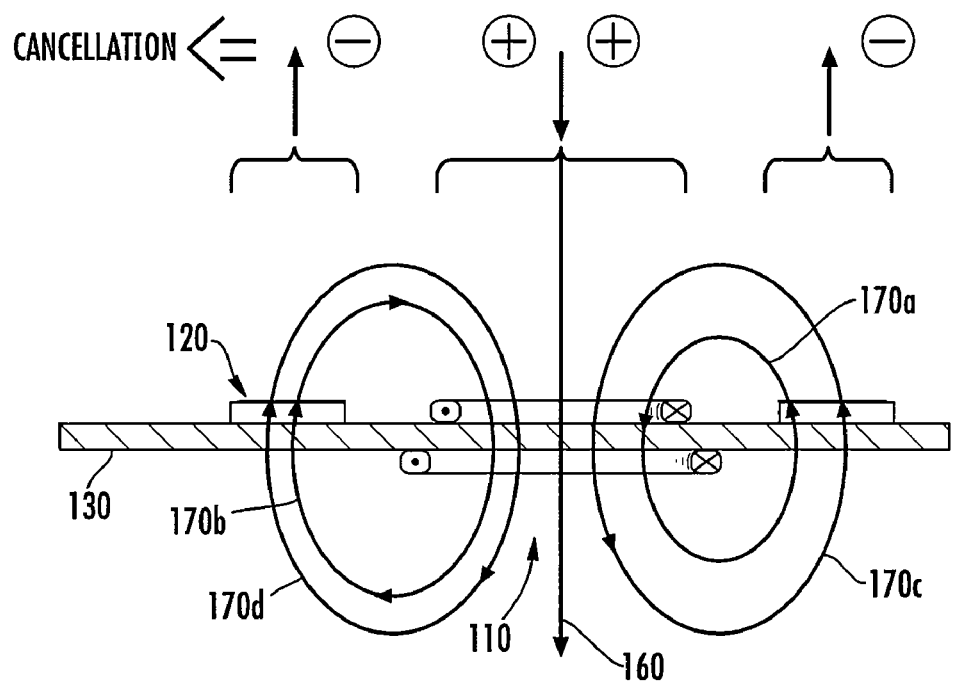
FIG. 1D is a transmission field diagram of the cross-sectional view of the reader coil arrangement shown in FIG. 1B.

FIG. 1D is a transmission field diagram of the cross-sectional view of the reader coil arrangement shown in FIG. 1B. During operation, the transmission coil 110 transmits a transmission signal including a carrier signal which generates a transmission field 160 flowing in the downward direction, as indicated by the arrowed transmission field line 160. The current flowing in the transmission coil 110 induces current flow in the reception coil 120, and the current flow in the transmission coil 110 generates a transmission field as indicated by the arrowed circular transmission field lines 170a, 170b, 170c, 170d (collectively, 170). Transmission field lines 170a and 170c show the transmission field flowing in a counterclockwise direction, and transmission field lines 170b and 170d show the transmission field flowing in a clockwise direction.

The reception coil 120 is designed to compensate for the transmission field of the transmission coil 110, while maintaining an ability to have reliable coupling with a contactless proximity card coil at any position along and any position proximate to the reception coil 120. Since the transmission field line 160 and the inner portions of the circular transmission field lines 170 are each flowing in the downward direction, they are additive. On the other hand, the outer portions of the circular transmission field lines 170 are flowing in the upward direction, and thus cancel the field lines flowing in the downward direction. In sum, when the transmission field 160 of the transmission coil 110 is added with the transmission field lines 170 of the reception coil 120 when the proximity card is not in proximity with the reader coil arrangement, the fields are cancelled, resulting in suppression of the carrier signal in the reception coil 120.

Figure 2A:
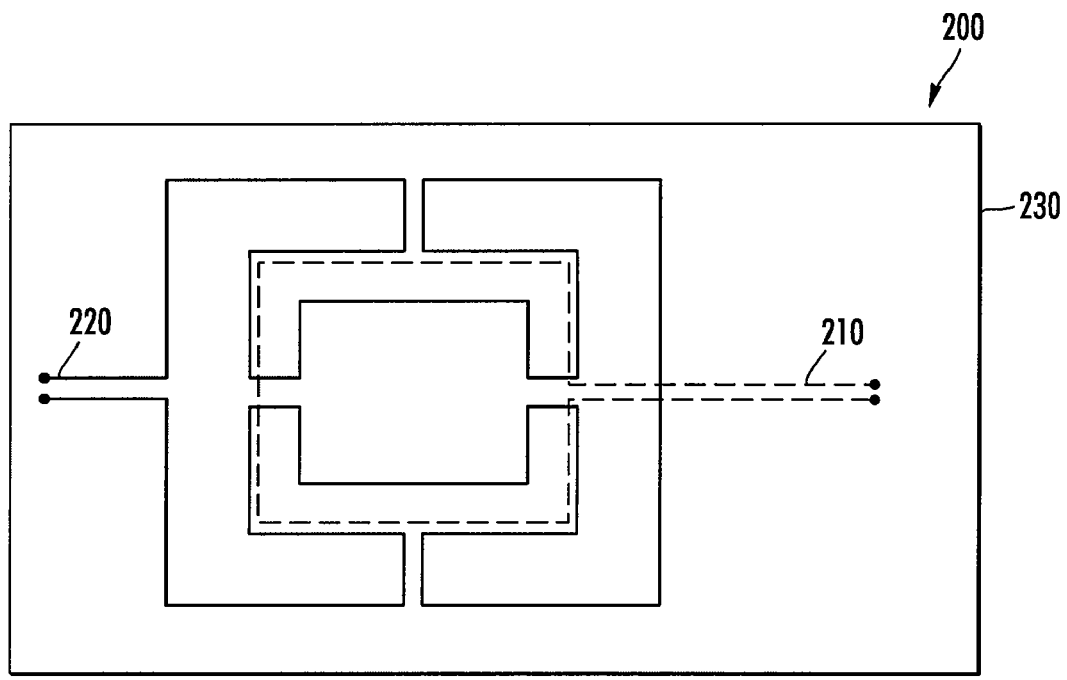
FIG. 2A is a plan view of a reader coil arrangement according to another embodiment of the present invention.

FIG. 2A is a plan view of a reader coil arrangement according to another embodiment of the present invention. Similar to the reader coil arrangement 100 shown in FIG. 1A, the reader coil arrangement 200 includes a loop transmission coil 210 and a separate reception coil 220 concentrically located on opposing sides of a PCB 230. However, the reader coil arrangement 200 differs from the reader coil arrangement 100 in that rather than the coils being substantially circular, the transmission coil 210 and the reception coil 220 are each substantially rectangular in shape. The operation of the reader coil arrangement 200 is substantially the same as that described above with respect to FIGS. 1A-D, and thus a repeated description here is not deemed to be necessary.

Figure 2B:
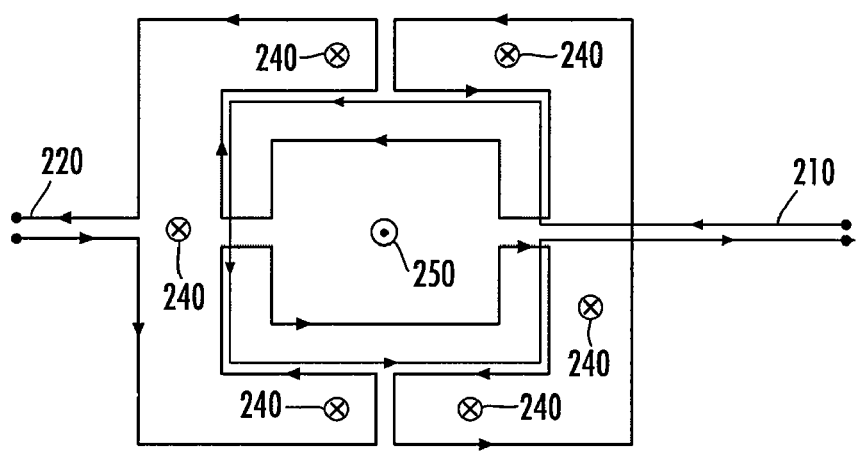
FIG. 2B is a diagram showing current flow of the reader coil arrangement of FIG. 2A.

FIG. 2B is a plan view of a diagram showing current flow of the reader coil arrangement of FIG. 2A. Similar to FIG. 1C described above, the arrows along the transmission coil 210 represent the direction of current flow during transmission of a transmission signal, and the arrows along reception coil 220 represent the direction of current flow during reception of the reception signal from the proximity card coil. The cross-circles 240 represent a transmission field direction into the paper on which FIG. 2B is drawn. The dotted-circle 250 represents a transmission field direction from the paper on which FIG. 2B is drawn.

For the sake of brevity, a cross-sectional view of the transmission field diagram of FIG. 2B is not shown. One of ordinary skill in the art would appreciate that such a view would be similar to that shown in FIG. 1D.

Figure 3A:
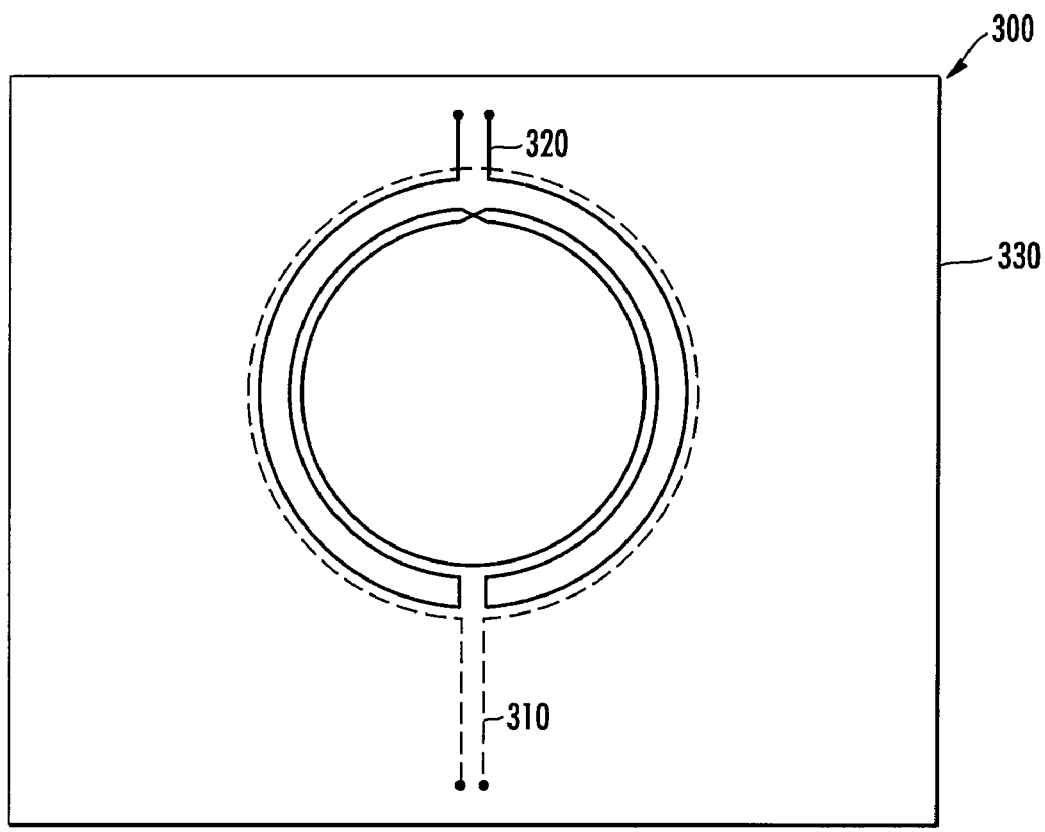
FIG. 3A is a plan view of a reader coil arrangement according to another embodiment of the present invention.

FIG. 3A is a plan view of a reader coil arrangement according to another embodiment of the present invention. Similar to the reader coil arrangement 100 shown in FIG. 1A, the reader coil arrangement 300 includes a loop transmission coil 310 and a separate reception coil 320 concentrically located on opposing sides of a PCB 330. However, the reader coil arrangement 300 differs from the reader coil arrangement 100 mainly in that the reception coil 320 is smaller than the transmission coil 310. Also, the shape of the reception coil 320, while substantially circular, differs in its specific layout. The operation of the reader coil arrangement 300 is substantially the same as that described about with respect to FIGS. 1A-D, and thus a description here is not deemed to be necessary.

Figure 3B:
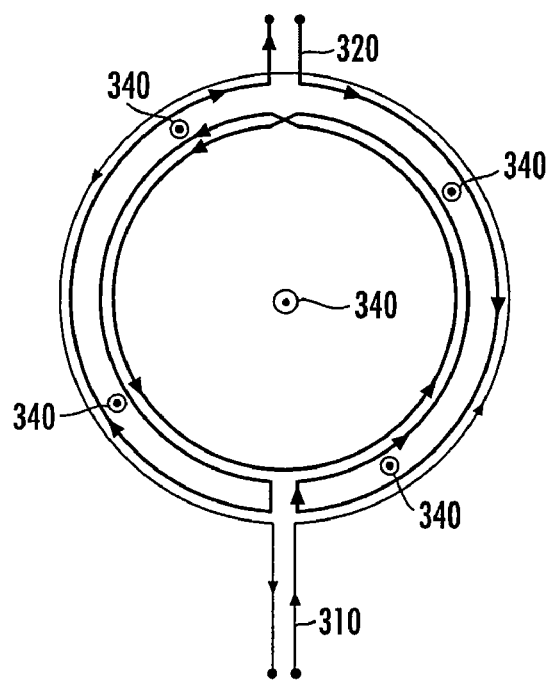
FIG. 3B is a diagram showing current flow of the reader coil arrangement of FIG. 3A.

FIG. 3B is a plan view of a diagram showing current flow of the reader coil arrangement of FIG. 3A. The arrows along the transmission coil 310 represent the direction of current flow during transmission of a transmission signal, and the arrows along reception coil 320 represent the direction of current flow during reception of the reception signal. The dotted-circles 340 represent a transmission field direction from the paper on which FIG. 3B is drawn.

For the sake of brevity, a cross-sectional view of the transmission field diagram of FIG. 3B is not shown. However, based on the description above, one of ordinary skill in the art would appreciate how the fields cancel. Thus a detailed description here is not deemed to be necessary.

The shape of the reception coil 120, 220, 320 is not limited to the particular shapes shown in FIGS. 1-3. Any shape that would result in the reception coil 120 significantly suppressing the carrier of the transmission signal while maintaining coupling with the proximity card coil at any position along and any position proximate to the reception coil and without the proximity card needing to be located at a predetermined distance relative to the reception coil, would be suffice.

Figure 4:
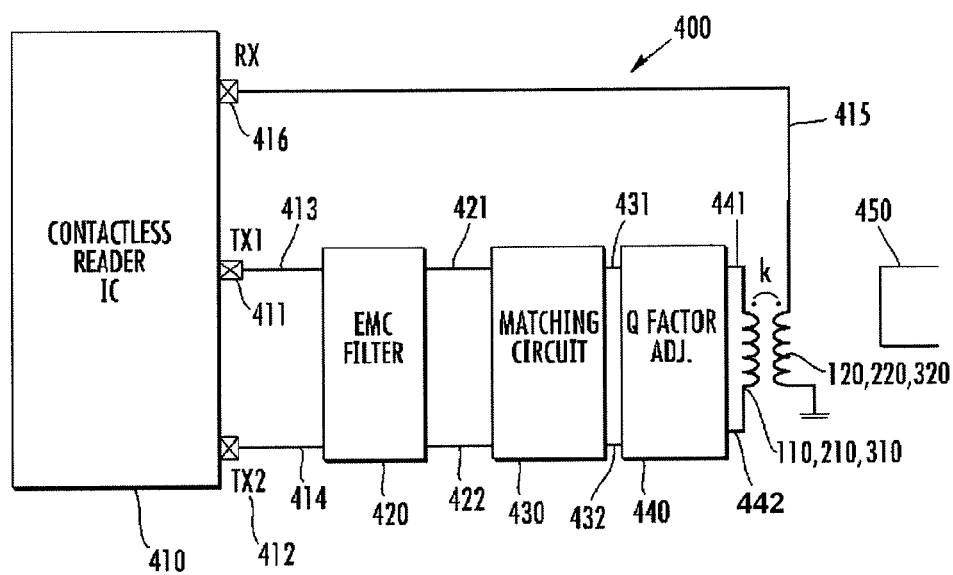
FIG. 4 is an implementation for a proximity card reader according to an embodiment of the present invention.

FIG. 4 is an implementation for a proximity card reader according to an embodiment of the present invention. The proximity card reader 400 includes a contactless reader integrated circuit (IC) 410 having two output transmitters 411, 412. In typical applications, the IC 410 is implemented using CMOS technology, though this is not required. An electromagnetic compatibility (EMC) filter 420, which filters out electromagnetic interference, receives a transmission signal from the output transmitters 411, 412 via conductors 413, 414. A matching circuit 430, which maximizes energy transfer of the transmission signal, receives the filtered signal from the EMC filter 420 via conductors 421, 422. A Q-factor adjuster 440, which adjusts gain of the transmission signal, receives the matched signal from the matching circuit 430 via conductors 431, 432. The transmission coil 110, 210, 310, which is described above with respect to FIGS. 1-3, receives the gain adjusted signal from the Q-factor adjuster 440 via conductors 441, 442, and transmits the transmission signal. The transmission signal includes a carrier signal and data, which is achieved by amplitude modulation of the carrier signal.

The reception coil 120, 220, 230, such as that described above with respect to FIGS. 1-3, is coupled to the transmission coil 110, 210, 310 by coupling factor k, which is the extent to which the magnetic field of the transmission and reception coils overlap. The reception coil 110, 210, 310 receives from a proximity card 450 a reception signal having the carrier signal, which has been modified in a way corresponding to data on the proximity card 450. The shape of the reception coil 120, 220, 320 is designed to significantly suppresses the carrier while maintaining coupling with the proximity card coil at any position along and any position proximate to the reception coil 120, 220, 320. The reception coil 120, 220, 320 is connected by line 415 directly to a receiver input 416 of the contactless reader IC 410, without any intervening voltage divider, therefore not reducing the data portion of the reception signal. The voltage of the signal input to the receiver input 416 is adjustable by the coupling factor k, which is preferably zero. The voltage is preferably adjusted to comply with an industry-accepted standard voltage to be input to the receiver input 416, such as approximately 3 volts.

The reception coil 120, 220, 320 of the present invention has numerous advantageous, such as significantly suppressing the carrier of the reception signal without decreasing the data response of a coupled proximity card. In one embodiment, the reception coil 120, 220, 320 is connected directly to the contactless reader IC 410 rather than being part of a resonance circuit, and therefore has a high bandwidth. The Q-factor of the transmission coil 110, 210, 310 does not limit the reception bandwidth, and the reception signal is much stronger and more reliable. Also, no carrier suppression filter is necessary, therefore resulting in a more simplified design and reduction in cost.

Figure 5:
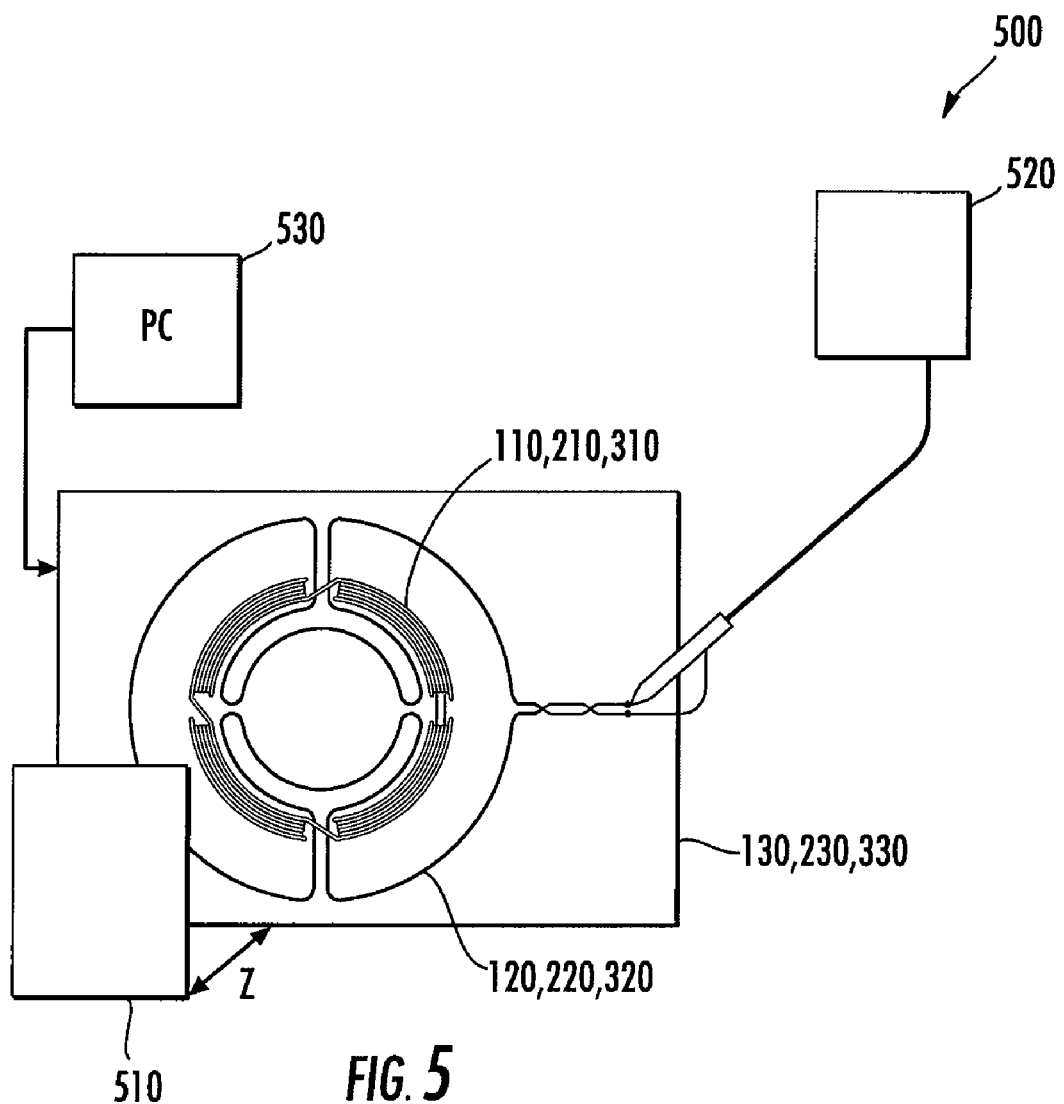
FIG. 5 is an implementation for a contactless test setup according to an embodiment of the present invention.

FIG. 5 is an implementation for a contactless test setup according to an embodiment of the present invention. The test setup 500 may be used to ensure that a proximity card 510 is in compliance with industry standards, such as ISO (International Organization for Standardization) 14443.

The test setup 500 includes the transmission coil 110, 210, 310 and the reception coil 120, 220, 320 on a PCB 130, 230, 330, as described above with respect to FIGS. 1-3. For the sake of simplicity, the tuning circuitry coupled to the transmission coil 110, 210, 310 is not shown. During testing, a personal computer (PC) 530 controls the transmission coil 110, 210, 310, which transmits a transmission signal having a carrier signal and data. The proximity card 510, which transmits a reception signal, is placed in a device under test (DUT) position near the reception coil 120, 220, 320, and a receiver 520, such as an oscilloscope, spectrum analyzer, or circuit that can receive modulated signals from the proximity card, connected to a probe on the reception coil 120, 220, 320 measures the modulated response signal strength of the proximity card 510. As described above, the shape of the reception coil 120, 220, 320 is designed to significantly suppress the carrier signal while maintaining coupling with the proximity card coil at any position along and any position proximate to the reception coil. Also, the data of the reception signal may be read by the reception coil 120 without the proximity card 510 being located at a predetermined distance Z relative to the reception coil 120, 220, 320.

The principles described above with respect to each of FIGS. 1A-C, 2A-B, 3A-B, 4, and 5 can be used for any contactless or radio frequency identification (RFID) reader, as well as for near field communication (NFC) applications. The proximity card is therefore not limited to any particular kind of proximity card. For example, the card may be may be an RFID card, a NFC device, proximity integrated circuit card (PICC), or any other such suitable card or device.

The transmission and reception coils of the present invention are not limited to any particular number of turns. The transmission coil will have one or two turns in most cases, but alternatively may have several turns. Furthermore, the transmission coil may have one "active" turn and a second "blind" turn used for electric field compensation, or may have two active and two blind turns, and so on. Similarly, the reception coil may have more than one turn.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:
1. A coil arrangement, comprising:
   a single, concentrated, planar transmission coil configured to transmit a transmission signal having a carrier; and
   a planar reception coil configured to receive from a source a reception signal having the carrier and data, and to significantly suppress the carrier while maintaining coupling with the source at any position along and any position proximate to the reception coil, wherein at least a portion of the reception coil is located outside the transmission coil, and at least a portion of the reception coil is located inside the transmission coil.

2. The coil arrangement of claim 1, wherein the carrier field of the transmission signal is suppressed in the reception coil.

3. The coil arrangement of claim 1, wherein the transmission coil and the reception coil are each substantially circular and are concentrically located.

4. The coil arrangement of claim 1, wherein the transmission coil and the reception coil are each substantially rectangular and are concentrically located.

5. The coil arrangement of claim 1, wherein the reception coil is shaped substantially as shown in FIG. 1A.

6. The coil arrangement of claim 1, wherein the reception coil is shaped substantially as shown in FIG. 2A.

7. The coil arrangement of claim 1, wherein the transmission coil and reception coil are located on opposing sides of a printed circuit board.

8. The coil arrangement of claim 1, wherein the transmission coil and reception coil are located on a same side of a printed circuit board.

9. The coil arrangement of claim 1, wherein the carrier is suppressed based at least in part on a coupling factor between the transmission coil and the reception coil.

10. The coil arrangement of claim 9, wherein the coupling factor is approximately zero.

11. The coil arrangement of claim 1, wherein the source is located within approximately 10 cm proximate to the reception coil.

12. A data transmission method comprising:
transmitting by a single, concentrated, planar transmission coil a transmission signal having a carrier;
receiving, by a planar reception coil, from a source a reception signal having the carrier and data; and
significantly suppressing the carrier, by the configuration of the reception coil, while maintaining coupling with the source at any position along and any position proximate to the reception coil,
wherein at least a portion of the reception coil is located outside the transmission coil, and at least a portion of the reception coil is located inside the transmission coil.

13. The data transmission method of claim 12, wherein the suppression of the carrier comprises a reception field of the reception signal canceling a transmission field of the transmission signal.

14. A planar reception coil, which is coupled with a single, concentrated, planar transmission coil, and is configured to receive from a source a reception signal having a carrier and data and to significantly suppress the carrier while maintaining coupling with the source at any position along and any position proximate to the reception coil, wherein the reception coil is separate from the transmission coil, wherein at least a portion of the reception coil is located outside the transmission coil, and at least a portion of the reception coil is located inside the transmission coil.

* * * * *